US010551622B2

(12) United States Patent
Robbins et al.

(10) Patent No.: US 10,551,622 B2
(45) Date of Patent: Feb. 4, 2020

(54) FIELD OF VIEW TILING IN WAVEGUIDE-BASED NEAR-EYE DISPLAYS

(71) Applicant: Microsoft Technology Licensing, LLC, Redmond, WA (US)

(72) Inventors: Steven John Robbins, Redmond, WA (US); Joshua Owen Miller, Woodinville, WA (US); Richard Andrew Wall, Kirkland, WA (US); Eliezer Glik, Seattle, WA (US); Jani Kari Tapio Tervo, Espoo (FI); Bernard Kress, Redwood City, CA (US); Xinye Lou, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 397 days.

(21) Appl. No.: 15/439,010

(22) Filed: Feb. 22, 2017

(65) Prior Publication Data
US 2018/0113309 A1 Apr. 26, 2018

Related U.S. Application Data
(60) Provisional application No. 62/413,315, filed on Oct. 26, 2016.

(51) Int. Cl.
G02B 27/01 (2006.01)
F21V 8/00 (2006.01)
(Continued)

(52) U.S. Cl.
CPC ....... G02B 27/0172 (2013.01); G02B 6/0016 (2013.01); G02B 6/0056 (2013.01);
(Continued)

(58) Field of Classification Search
CPC .................................................. G02B 27/0172
(Continued)

(56) References Cited

U.S. PATENT DOCUMENTS 5,497,270 A 3/1996 Rud
5,870,159 A 2/1999 Sharp
(Continued)

FOREIGN PATENT DOCUMENTS

WO 2012009115 A1 1/2012

OTHER PUBLICATIONS

Äyräs, et al., "Exit pupil expander with a large field of view based on diffractive optics", In Journal of the Society for Information Display, vol. 17, Issue 8, Aug. 2009, 2 pages.
(Continued)

Primary Examiner — William C Vaughn, Jr.
Assistant Examiner — Daniel T Tekle
(74) Attorney, Agent, or Firm — Arent Fox LLP

(57) ABSTRACT

An input-coupler of an optical waveguide includes one or more Bragg polarization gratings for coupling light corresponding to the image in two different directions into the optical waveguide. The input-coupler splits the FOV of the image coupled into the optical waveguide into first and second portions by diffracting a portion of the light corresponding to the image in a first direction toward a first intermediate component, and diffracting a portion of the light corresponding to the image in a second direction toward a second intermediate component. An output-coupler of the waveguide combines the light corresponding to the first and second portions of the FOV, and couples the light corresponding to the combined first and second portions of the FOV out of the optical waveguide so that the light corresponding to the image and the combined first and second portions of the FOV is output from the optical
(Continued)

waveguide. The input-coupler splitting the light to two or more intermediate components provides an increased FOV.

20 Claims, 8 Drawing Sheets

(51) Int. Cl.
*G02B 6/124* (2006.01)
*G02B 6/126* (2006.01)
*G02B 27/42* (2006.01)
*H04N 13/337* (2018.01)
*H04N 13/341* (2018.01)
*H04N 13/344* (2018.01)
*H04N 13/398* (2018.01)

(52) U.S. Cl.
CPC .............. *G02B 6/124* (2013.01); *G02B 6/126* (2013.01); *G02B 27/4261* (2013.01); *H04N 13/337* (2018.05); *H04N 13/341* (2018.05); *H04N 13/344* (2018.05); *H04N 13/398* (2018.05); *G02B 2027/0125* (2013.01); *H04N 2213/001* (2013.01)

(58) Field of Classification Search
USPC .......................................................... 348/57
See application file for complete search history.

(56) References Cited

U.S. PATENT DOCUMENTS

| 8,233,204 | B1 | 7/2012 | Robbins et al. |
| 8,508,848 | B2 | 8/2013 | Saarikko |
| 8,903,207 | B1 | 12/2014 | Brown et al. |
| 8,982,313 | B2 | 3/2015 | Escuti et al. |
| 9,244,280 | B1 | 1/2016 | Tiana et al. |
| 9,274,338 | B2 | 3/2016 | Robbins et al. |
| 2006/0291021 | A1* | 12/2006 | Mukawa .................. G02B 5/32 359/15 |
| 2012/0013651 | A1* | 1/2012 | Trayner .................. G02B 5/32 345/690 |
| 2013/0188150 | A1 | 7/2013 | DeCusatis |
| 2014/0104665 | A1 | 4/2014 | Popovich et al. |
| 2014/0268356 | A1 | 9/2014 | Bolas et al. |
| 2016/0033698 | A1 | 2/2016 | Escuti et al. |
| 2017/0184848 | A1* | 6/2017 | Vallius .................... G02B 3/14 |

OTHER PUBLICATIONS

Saarikko, Pasi, "Diffractive exit-pupil expander with a large field of view", In Proceedings of SPIE—The International Society for Optical Engineering, Apr. 2008, 3 pages.

Han, et al., "Portable waveguide display system with a large field of view by integrating freeform elements and volume hologram", In Journal of Optics Express, vol. 23, Issue 3, Feb. 4, 2015, pp. 3534-3549.

* cited by examiner

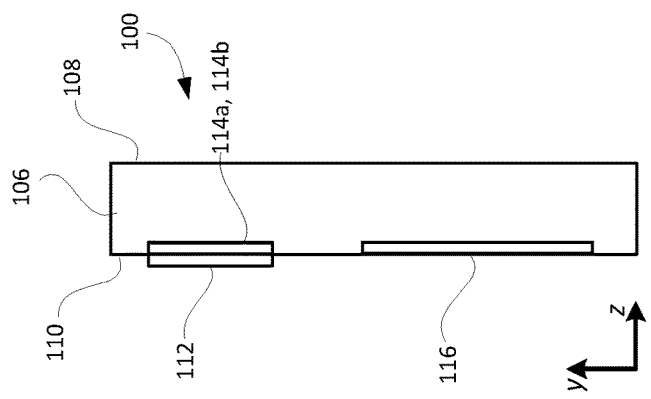
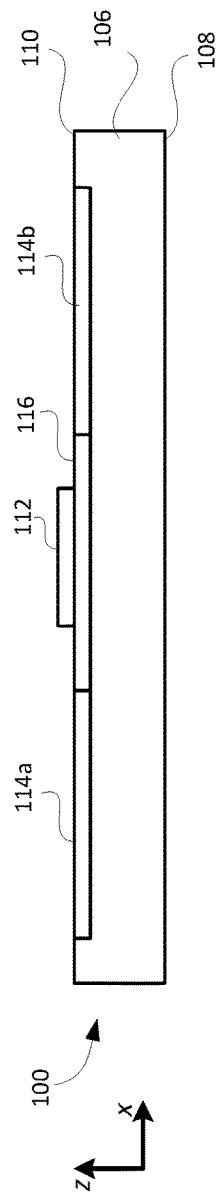
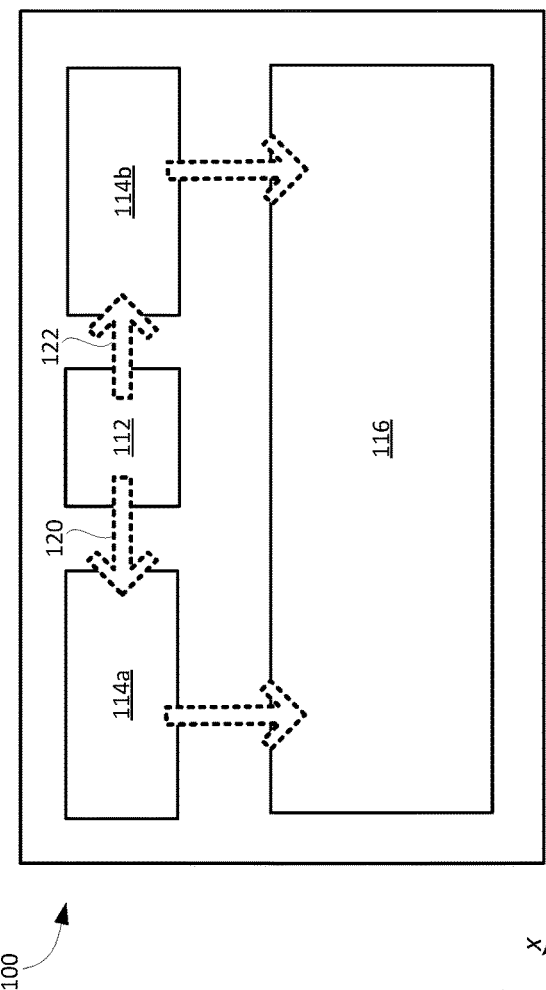

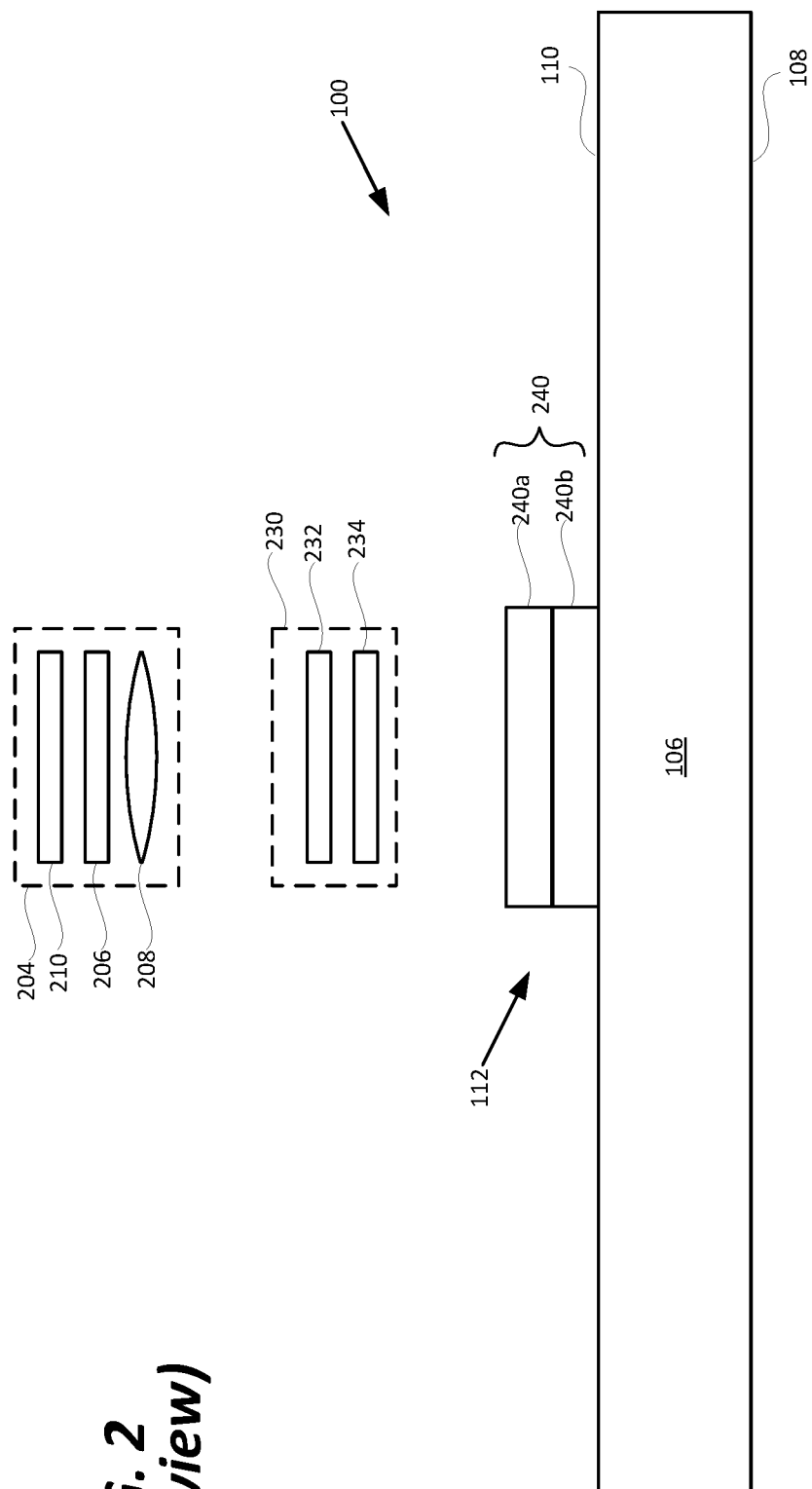

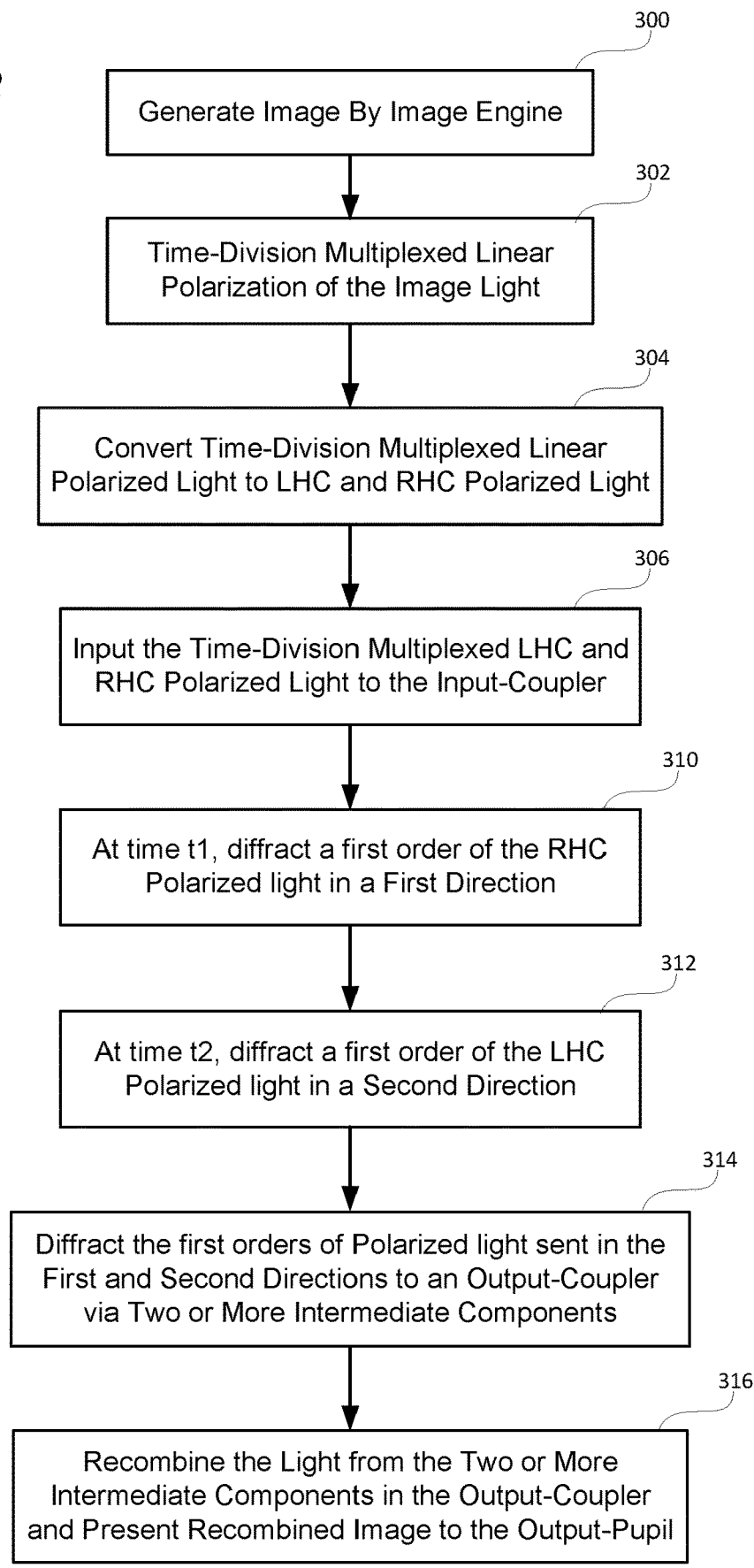

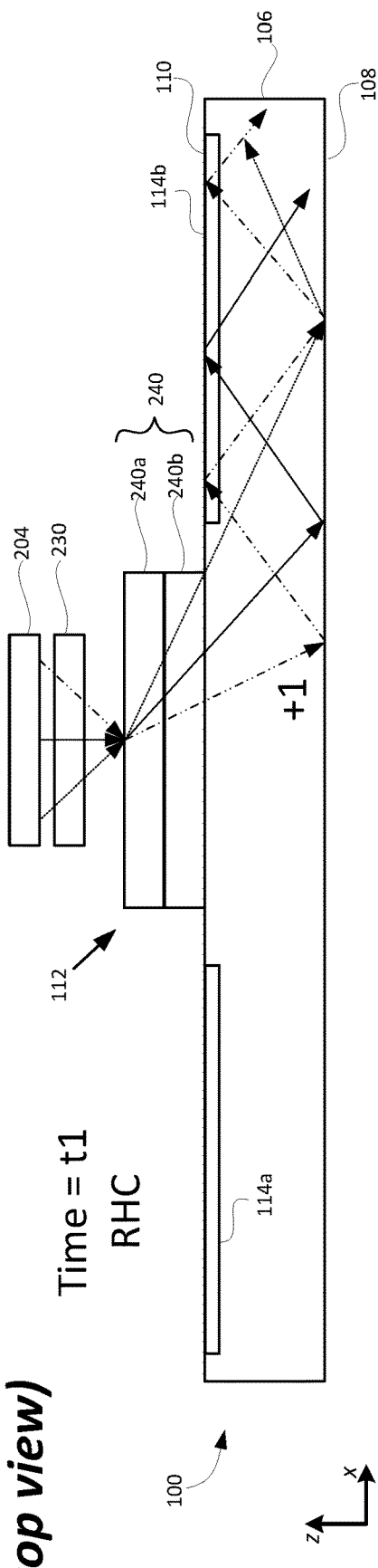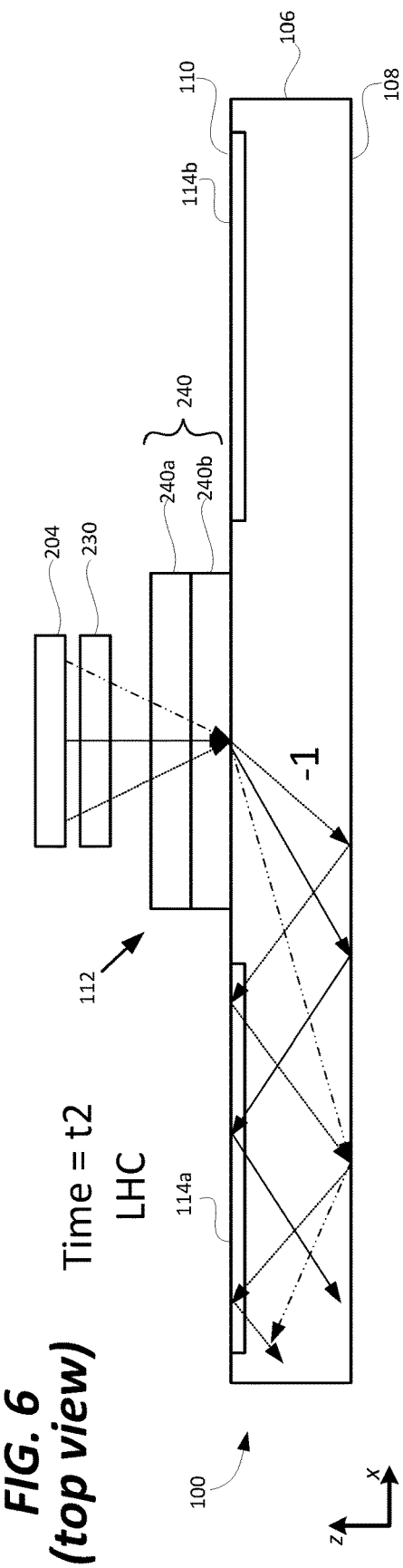

*(side view)*

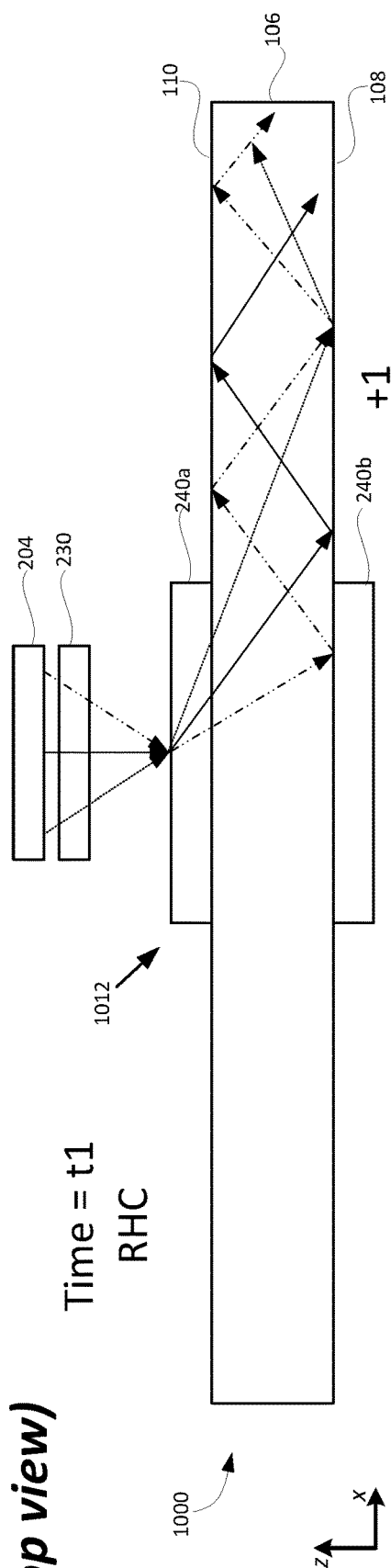
FIG. 9 (top view)
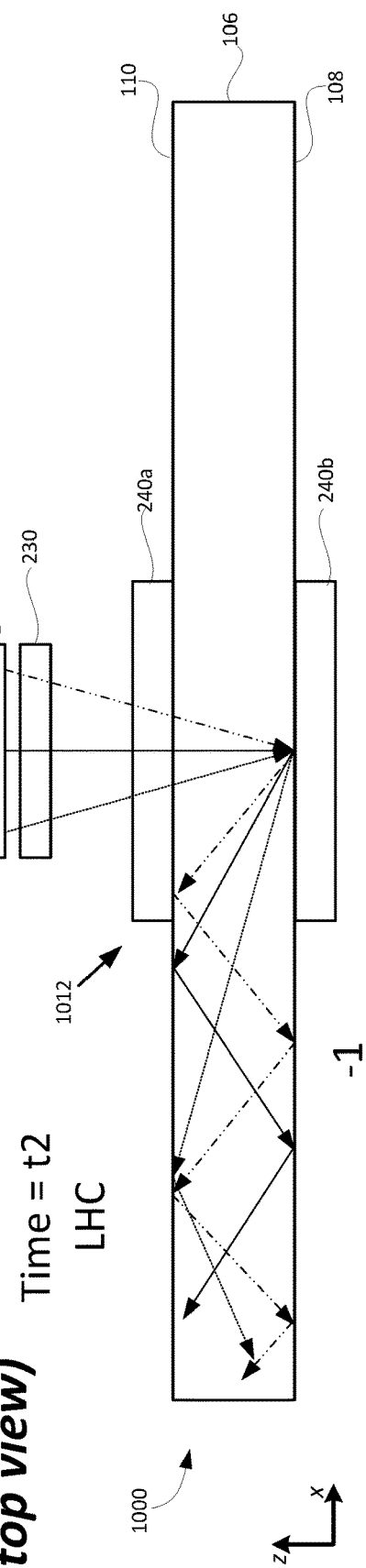
FIG. 10 (top view)

FIELD OF VIEW TILING IN WAVEGUIDE-BASED NEAR-EYE DISPLAYS

CLAIM OF PRIORITY

The present application claims priority to U.S. Provisional Application No. 62/413,315, entitled "FIELD OF VIEW TILING IN WAVEGUIDE-BASED NEAR-EYE DISPLAYS," filed Oct. 26, 2016, which is herein incorporated by reference in its entirety.

BACKGROUND

Various types of computing, entertainment, and/or mobile devices can be implemented with a near-eye transparent or semi-transparent display through which a user of a device can view the surrounding environment. Such devices enable a user to see through the transparent or semi-transparent display of the device to view the surrounding environment, and also see images of virtual objects (e.g., text, graphics, video, etc.) that are generated for display to appear as a part of, and/or overlaid upon, the surrounding environment.

These devices often utilize optical waveguides to replicate an image, e.g., produced by a display engine, to a location where a user of a device can view the image as a virtual image in an augmented reality environment. As this is still an emerging technology, there are certain challenges associated with utilizing waveguides to display images of virtual objects to a user.

In near-eye display devices that utilize optical waveguides, such as head mounted displays (HMDs), heads up displays (HUDs) and other types of imaging devices, light propagates through the optical waveguide only over a limited range of internal angles. Light propagating at some non-zero angle of incidence to a surface of the waveguide will travel within the waveguide, bouncing back and forth between the surfaces, so long as the angle of incidence with respect to the surface normal is greater than some critical angle associated with the material from which the optical waveguide is made. For example, for BK-7 glass, this critical angle is about 42 degrees. This critical angle can be lowered slightly by using a reflective coating, or by using a material having a higher index of refraction, which is typically more expensive.

Regardless, the range of internal angles over which light will propagate through an optical waveguide does not vary much, and for glass, the maximum range of internal angles is typically below 50 degrees. This typically results in a range of angles exiting the waveguide (i.e., angles in air) of less than 40 degrees, and typically even less when other design factors are taken into account. For example, in optical waveguides that include an intermediate component used for pupil expansion, which is distinct from the input-coupler and output-coupler of the waveguide, the intermediate component typically limits the diagonal field-of-view (FOV) that can be supported by an optical waveguide based display to no more than 35 degrees.

SUMMARY

Certain embodiments of the present technology relate to an optical assembly for use in a near-eye display including an increased field of view (FOV). The optical assembly in general is used to replicate an image from an input-pupil to an expanded output-pupil of the optical assembly. In accordance with an embodiment, the optical assembly comprises an optical waveguide including an input-coupler, first and second intermediate components and an output-coupler. The input-coupler includes one or more polarization gratings, which in embodiments may be configured according to the Bragg regime.

The one or more polarization gratings diffract polarized light from the image in two different directions according to a time-division multiplexed scheme. At a first time, a positive first order diffraction of polarized image light is steered, or tiled, to the first intermediate component, and at a second time, a negative first order diffraction of polarized image light is tiled to the second intermediate component. The image light from the first and second intermediate components is then recombined at the output-coupler, where the image light exits the output-pupil of the waveguide with a FOV including the image. For a given size display engine and waveguide, time-division multiplexed tiling of the image by the one or more input-coupler polarization gratings to the first and second intermediate components enables a significant increase in the size of the FOV.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

FIGS. 1A, 1B and 1C are front, top and side views, respectively, of a waveguide according to embodiments of the present technology that can be used to replicate an image associated with an input-pupil to an expanded output-pupil.

FIG. 2 is top view of a waveguide, light engine and polarization assembly according to embodiments of the present technology.

FIG. 3 is a flowchart showing operation of an embodiment of the present technology.

FIG. 5 is a top view showing diffraction of light by the Bragg polarization gratings of the input-coupler at a first time in a first direction into the waveguide.

FIG. 6 is a top view showing diffraction of light by the Bragg polarization gratings of the input-coupler at a second time in a second direction into the waveguide.

FIGS. 9 and 10 show diffraction of light by the Bragg polarization gratings of the input-coupler at first and second times according to an alternative embodiment of the present technology.

DETAILED DESCRIPTION

Figure 4:
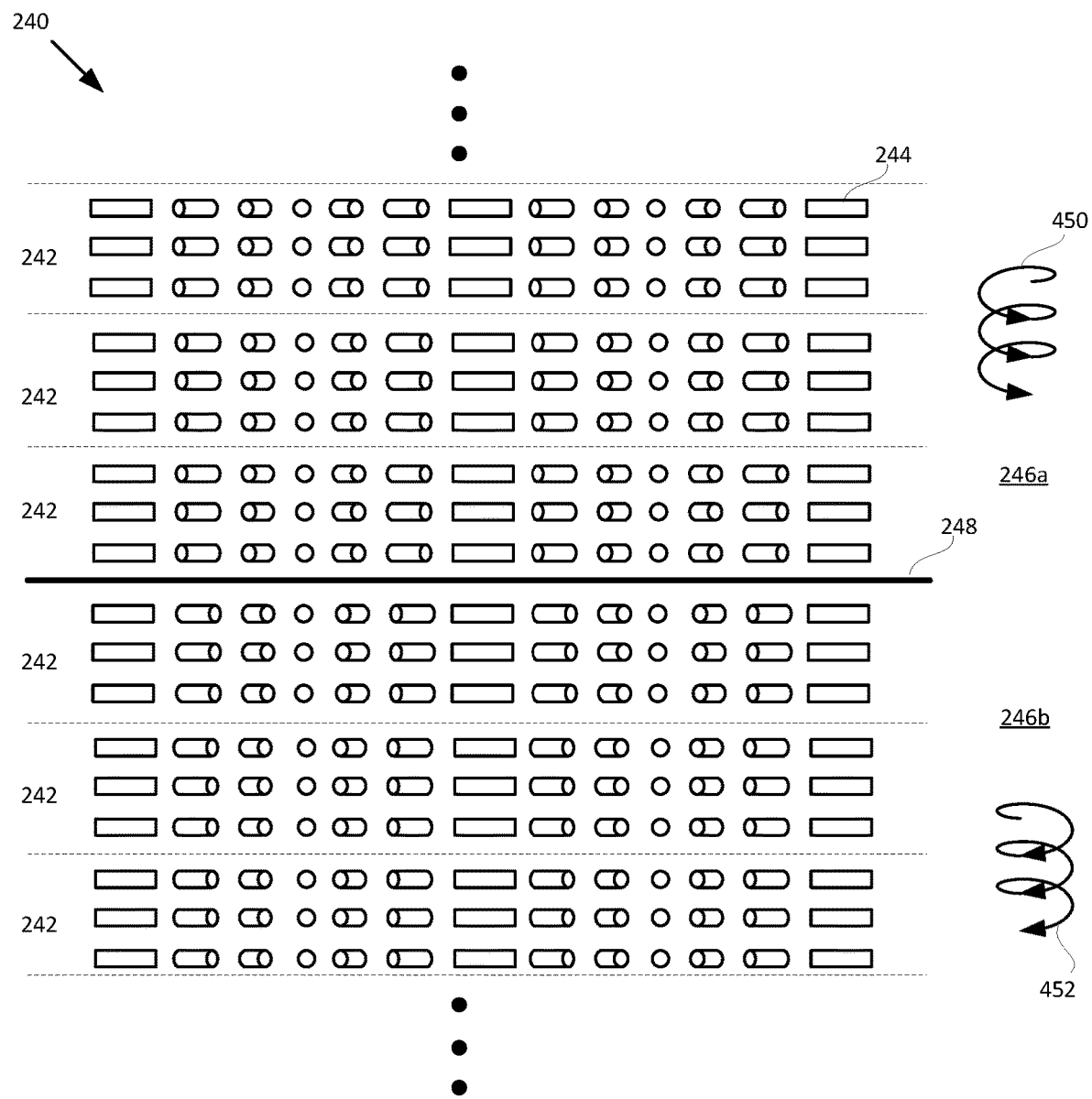
FIG. 4 is a magnified view showing liquid crystal molecular orientation within a Bragg polarization grating for use in embodiments of the present technology.

Certain embodiments of the present technology can be used to increase (also referred to as expand) the FOV that can be supported by an optical waveguide. In embodiments, the optical waveguide includes an input-coupler, first and second intermediate components and an output-coupler. The optical waveguide receives an image generated by a display engine at an input pupil of the input-coupler, and replicates the image in an expanded FOV at an output pupil of the output coupler.

Light from the display engine is polarized before entering the waveguide by a polarization assembly which may generate a right-handed circular (RHC) polarization and a left-handed circular (LHC) polarization of the image light. The polarization assembly employs a time-division multiplexing scheme so that the image light input to the input-coupler is rapidly switched between the LHC and RHC polarizations.

The input-coupler comprises one or more polarization gratings, which in embodiments may be configured according to the Bragg regime. Such gratings are referred to herein as Bragg polarization gratings, or more simply, as BPGs. By tuning the one or more BPGs, the one or more BPGs may diffract a first order of the RHC polarized image light to the first intermediate component, and a first order of the LHC polarized image light to the second intermediate component. The image light from the first and second components then recombines at the output-coupler, which provides a FOV including the image at the output-pupil.

The time-division multiplexed tiling of the image light to the first and second components, and recombination at the output-coupler, provides a unified FOV that is greater than a maximum FOV that each of the first and second intermediate components can support on their own. The unified FOV can also be referred to as a combined FOV.

It is understood that the present invention may be embodied in many different forms and should not be construed as being limited to the embodiments set forth herein. Rather, these embodiments are provided so that this disclosure will be thorough and complete and will fully convey the invention to those skilled in the art. Indeed, the invention is intended to cover alternatives, modifications and equivalents of these embodiments, which are included within the scope and spirit of the invention as defined by the appended claims. Furthermore, in the following detailed description of the present invention, numerous specific details are set forth in order to provide a thorough understanding of the present invention. However, it will be clear to those of ordinary skill in the art that the present invention may be practiced without such specific details.

The terms "top" and "bottom," "upper" and "lower," "vertical" and "horizontal," and "left" and "right," and forms thereof, as may be used herein are by way of example and illustrative purposes only, and are not meant to limit the description of the invention inasmuch as the referenced item can be exchanged in position and orientation. Also, as used herein, the terms "substantially" and/or "about" mean that the specified dimension or parameter may be varied within an acceptable manufacturing tolerance for a given application. In one embodiment, the acceptable manufacturing tolerance is ±0.25%.

Embodiments of the present technology will now be described with reference to FIGS. 1A, 1B and 1C. In the description that follows, like numerals or reference designators will be used to refer to like parts or elements throughout. In addition, the first digit of each reference number may identify the drawing in which the reference number first appears.

FIGS. 1A, 1B and 1C are front, top and side views, respectively, of an optical waveguide 100 that can be used to replicate an image associated with an input-pupil to an expanded output-pupil. The term "input-pupil," as used herein, refers to an aperture through which light corresponding to an image is overlaid on an input-coupler of a waveguide. The term "output-pupil," as used herein, refers to an aperture through which light corresponding to an image exits an output-coupler of a waveguide. The optical waveguide 100 will often be referred to hereafter more succinctly simply as a waveguide 100, and may also be referred to as an optical assembly.

Referring to FIGS. 1A, 1B and 1C, the optical waveguide 100 includes a bulk-substrate 106 having an input-coupler 112 and an output-coupler 116. The input-coupler 112 is configured to couple light corresponding to an image associated with an input-pupil into the bulk-substrate 106 of the waveguide. The image light may be generated by a display engine 204 (explained below with respect to FIG. 2). The output-coupler 116 is configured to couple the light corresponding to the image associated with the input-pupil, which travels in the optical waveguide 100 from the input-coupler 112 to the output-coupler 116, out of the waveguide 100 so that the light is output and viewable from the output-pupil.

The bulk-substrate 106, which can be made of glass or optical plastic, but is not limited thereto, includes a first major planar surface 108 and a second major planar surface 110 opposite and parallel to the first major planar surface 108. The first major planar surface 108 can alternatively be referred to as the front-side major surface 108 (or more simply the front-side surface 108), and the second major planar surface 110 can alternatively be referred to as the back-side major surface 110 (or more simply the back-side surface 110).

A substrate is considered to be "bulk" substrate, as that term I used herein, where the thickness of the substrate (between its major surfaces) is at least ten times (i.e., 10×) the wavelength of the light for which the substrate is being used as an optical transmission medium. For an example, where the light (for which the substrate is being used as an optical transmission medium) is red light having a wavelength of 620 nm, the substrate will be considered a bulk-substrate where the thickness of the substrate (between its major surfaces) is at least 6200 nm, i.e., at least 6.2 µm.

In accordance with certain embodiments, the bulk-substrate 106 has a thickness of at least 25 µm between its major planar surfaces 108 and 110. In specific embodiments, the bulk-substrate 106 has a thickness (between its major surfaces) within a range of 100 µm to 1500 µm, with a likely thickness of about 1000 µm. The bulk-substrate 106, and more generally the waveguide 100, is transparent, meaning that it allows visible light to pass through it so that a user can see through the waveguide 100 and observe objects on an opposite side of the waveguide 100 than the user's eye(s).

The optical waveguide 100 in FIGS. 1A, 1B and 1C is also shown as including first and second intermediate components 114a and 114b. As explained below, the input-coupler 112 is configured to couple light into the waveguide 100 (and more specifically, into the bulk-substrate 106 of the waveguide 100) and in first and second directions (arrows 120, 122, FIG. 1A) to the intermediate components 114a, 114b, respectively. In the configuration shown, the first direction is a horizontal leftward direction, and the second direction is a horizontal rightward direction. As explained below, the first and second directions may also be angled downward relative to the input-coupler 112 in further embodiments.

The intermediate components 114a, 114b are configured to redirect the received light in a direction of the output-coupler 116. Further, the intermediate components 114a, 114b may be configured to perform one of horizontal or vertical pupil expansion, and the output-coupler 116 may be configured to perform the other one of horizontal or vertical pupil expansion. For example, the intermediate components 114a, 114b can be configured to perform horizontal pupil expansion, and the output-coupler 116 can be configured to perform vertical pupil expansion.

The input-coupler 112, the intermediate components 114a, 114b and the output-coupler 116 can be referred to collectively herein as optical components 112, 114a, 114b and 116 of the waveguide, or more succinctly as components 112, 114a, 114b and 116.

It is possible that a waveguide includes an input-coupler and an output-coupler, without including an intermediate components. In such embodiments, the input-coupler would be configured to couple light into the waveguide and diffract that light in two directions toward the output-coupler. In such embodiments, the output-coupler can provide one of horizontal or vertical pupil expansion, depending upon the implementation.

In FIG. 1A, the input-coupler 112, the intermediate components 114a, 114b and the output-coupler 116 are shown as having rectangular outer peripheral shapes, but can have alternative outer peripheral shapes. For example, the input-coupler 112 can alternatively have a circular outer peripheral shape, but is not limited thereto. For another example, the intermediate components 114a, 114b can have a triangular, trapezoidal or hexagonal outer peripheral shape, but is not limited thereto. Further, it is noted that the corners of each of the peripheral shapes, e.g., where generally rectangular or triangular, can be chamfered or rounded, but are not limited thereto. These are just a few exemplary outer peripheral shapes for the input-coupler 112, the intermediate components 114a, 114b and the output-coupler 116, which are not intended to be all encompassing.

As can best be appreciated from FIGS. 1A and 1C, the input-coupler 112 may be provided above a surface of the waveguide 100 (i.e., the back-side surface 110), while the intermediate components 114a, 114b and the output-coupler 116 may be provided within a surface of the waveguide 100 (i.e., the back-side surface 110). In such a case, the input-coupler 112 can be transmissive (e.g., a transmission grating), the intermediate components 114a, 114b can be reflective (e.g., a reflective grating), and the output-coupler 116 can also be reflective (e.g., a further reflective grating).

One or more of the input-coupler 112, the intermediate components 114a, 114b and the output-coupler 116 can alternatively be provided in the front-side surface 108 of the waveguide 100. In an embodiment where all of the components are at the front-side surface, the input-coupler 112 can be reflective (e.g., a reflective grating), the intermediate components 114a, 114b can be reflective (e.g., a further reflective grating), and the output-coupler 116 can also be transmissive (e.g., a transmission grating). As explained below, the input-coupler 112 may be split so that a portion is on the back-side surface 110 (transmissive), and a portion is on the front-side surface 108 (reflective).

Alternatively, one or more of the input-coupler 112, the intermediate components 114a, 114b and the output-coupler 116 can be embedded (also referred to as immersed) in the bulk-substrate 106. For example, the bulk-substrate 106 can be separated into two halves (that are parallel to the major surfaces 108 and 110), and the input-coupler 112, the intermediate components 114a, 114b and/or the output-coupler 116 can be provided in on one of the inner surfaces of the two halves, and the inner surfaces of the two halves can be adhered to one another.

It is also possible that one of the input-coupler 112, the intermediate components 114a, 114b and the output-coupler 116 is provided in or on the front-side surface 108 of the substrate 106, another one of the components 112, 114 and 116 is provided in or on the back-side surface 110, and the last one of the components 112, 114 and 116 is embedded or immersed in the bulk-substrate 106. More generally, unless stated otherwise, any individual one of the input-coupler 112, the intermediate components 114a, 114b and the output-coupler 116 can be provided in or on either one of the major planar surfaces 108 or 110 of the bulk-substrate 106, or embedded therebetween.

In embodiments, each of the input-coupler 112, components 114a, 114b and output-coupler 116 may be implemented as diffraction gratings or more generally, as diffractive optical elements (DOEs). Each of the components 112, 114a, 114b and 116 are able to split and change direction of incident light due to an optical phenomenon known as diffraction. The splitting (known as optical orders) and angle change depend on the characteristics of the grating.

The input-coupler 112 may have a design that is distinct from that of the intermediate components 114a, 114b and the output-coupler 116. As explained below, in embodiments, the input-coupler 112 may be a volume grating, and may include one or more Bragg polarization gratings. By contrast, the intermediate components 114a, 114b and the output-coupler 116 can each be implemented as a surface grating.

The one or more Bragg polarization gratings of the input-coupler 112 are discussed below. The surface gratings of components 114a, 114b and 116 may include a periodic structure in or on the surface of the optical component. When the periodic structure is due to varying of the surface itself, it is referred to as a surface relief grating (SRG). For example, an SRG can include uniform straight grooves in a surface of an optical component that are separated by uniform straight groove spacing regions. Groove spacing regions can be referred to as "lines", "grating lines" or "filling regions". The spacing between grooves may be referred to herein as the pitch of the grating.

The nature of the diffraction by an SRG depends on the wavelength, polarization and angle of light incident on the SRG and various optical characteristics of the SRG, such as refractive index, grating pitch, groove depth, groove profile, groove fill ratio and groove slant angle. An SRG can be fabricated by way of a suitable microfabrication process, which may involve etching of and/or deposition on a substrate to fabricate a desired periodic microstructure on the substrate to form an optical component, which may then be used as a production master such as a mold or mask for manufacturing further optical components.

Referring specifically to FIG. 1A, in an exemplary embodiment, the output-coupler 116 can have surface gratings that extend in a horizontal (x) direction, and the intermediate components 114a, 114b can have surface gratings that extend diagonal (e.g., ~45 degrees) relative to the horizontal and vertical directions. This is just an example. Other variations are also possible.

Each surface grating can have a preferential linear polarization orientation specified by a direction of the grating lines of the diffraction grating, wherein the coupling efficiency for light having the preferential linear polarization orientation will be higher than for light having a non-preferential linear polarization orientation.

As explained below, it is a feature of Bragg polarization gratings, such as used in embodiments of input-coupler 112, that it has a high coupling efficiency for light having the preferential circular polarization orientation. In further embodiments, it is conceivable that one or more of the components 114a, 114b and/or 116 be implemented as a volume grating, such as a Bragg polarization grating.

It is a problem of conventional optical waveguides used for example in near-eye displays that they can support a diagonal FOV of only about 35 degrees, where the index of refraction of the bulk-substrate is about 1.7. Conventional waveguides couple light from an input-coupler to a single intermediate component, and it this single intermediate component that limits the diagonal FOV to about 35 degrees. One possible way to attempt to increase (also referred to as extend) the diagonal FOV is to increase the index of refraction of the bulk-substrate 106 of the optical waveguide 100, which would enable the intermediate component 112 to support a larger diagonal FOV. However, materials (e.g., glass) having such a high index of refraction are very expensive. Further, suitable materials for producing bulk-substrates having such a high index of refraction in large quantities are not readily available. Accordingly, literature about waveguide based displays that include an intermediate component for use in pupil expansion typically specify that the upper limit for the diagonal FOV is about 35 degrees.

The diagonal FOV may be substantially increased in accordance with embodiments of the present technology. In particular, by tiling an input-coupler capable of providing an image from a display engine to two separate intermediate components (114a, 114b), the FOV may be substantially increased, theoretically to around 70 degrees, and this without having to modify or enlarge the display engine. Further details of the components and operation of the optical assembly shown in FIGS. 1A-1C will now be explained with reference to FIG. 2 and the flowchart of FIG. 3.

FIG. 2 is a top view of an embodiment of an optical waveguide 100 in accordance with the present technology. In FIG. 2, the first and second intermediate components 114a, 114b and the output-coupler 116 are omitted for clarity. FIG. 2 includes a display engine 204. The display engine 204 can include, e.g., an image former 206, a collimating lens 208 and an illuminator 210 for generating an image in step 300. It is understood that the display engine 204 may include other or additional components in further embodiments.

The image former 206 can be implemented using a transmissive projection technology where a light source is modulated by an optically active material, and backlit with white light. These technologies are usually implemented using liquid crystal display (LCD) type displays with powerful backlights and high optical energy densities. The illuminator 210 can provide the aforementioned backlighting.

The image former 206 can also be implemented using a reflective technology for which external light is reflected and modulated by an optically active material. Digital light processing (DLP), liquid crystal on silicon (LCOS) and Mirasol® display technology from Qualcomm, Inc. are all examples of reflective technologies. Alternatively, the image former 206 can be implemented using an emissive technology where light is generated by a display, such as for example, Organic LEDs and Inorganic LEDs. Another example of emissive display technology is a micro organic light emitting diode (OLED) display. Companies such as eMagin and Microoled provide examples of micro OLED displays. The image former 206, alone or in combination with the illuminator 210, can also be referred to as a micro display.

The collimating lens 208 is arranged to receive a diverging display image from the image former 206, to collimate the display image, and to direct the collimated image toward the input-coupler 112 of the waveguide 100. In accordance with an embodiment, an entry pupil associated with the waveguide may be approximately the same size as an output pupil associated with the image former 206, e.g., 5 mm or less in some embodiments, but is not limited thereto.

In FIG. 2, the display engine 204 is shown as facing the back-side surface 110 of the waveguide 100. As explained below, when used in a near-eye display, the front-side surface 108 may be adjacent an eye of a wearer. This provides for a periscope type of configuration in which light enters the waveguide on one side of the waveguide 100, and exits the waveguide at an opposite side of the waveguide 100. Alternatively, the input-coupler 112 and the output-coupler 116 can be implemented in a manner such that the display engine 204 and the eye of the wearer are proximate to and face a same major planar surface (108 or 110).

Before entering the input-coupler 112, light from the display engine 204 may pass through a light polarization assembly 230. In accordance with aspects of the present technology, the light polarization assembly 230 may include a fast polarization modulator (FPM) 232 and a chromatic quarter-waveplate 234. FPM 232 may be an LC-based polarization modulator/rotator that controls light polarization by an externally applied drive voltage. Thus, in step 302, the light from the display engine 204 may be linearly polarized with no moving parts, without vibration and in a device having a small footprint. An FPM 232 for use with the present technology is available for example from LC-TEC Displays AB, Borlange, Sweden.

The FPM 232 also achieves time-division multiplexed switching back and forth between two orthogonal linear polarization states at a desired switch rate. In embodiments, the FPM may switch the polarization state of received light once per frame, though it may be more or less frequent than that. In embodiments, the display engine 204 may generate frames at a rate of 60 to 120 frames per second, though it may be faster or slower than that in further embodiments.

In step 304, the quarter-waveplate 234 converts the linear polarization from the FPM 232 to circular polarization of its corresponding handedness, namely left-handed circular (LHC) or right-handed circular (RHC). The quarter-waveplate cycles between generating RHC polarized light and LHC polarized light, based on the linear polarization received from the FPM 232. A quarter-waveplate 234 for use with the present technology is available for example from Thorlabs, Inc., Newton, N.J. It is understood that the polarization assembly 230 may include other or alternative components for generating time-division multiplexed switching between LHC and RHC polarized image light.

In step 306, the time-division multiplexed RHC and LHC polarized image light is input into the input-coupler 112. In accordance with aspects of the present technology the input-coupler 112 may be or include one or more Bragg polarization gratings (BPGs) 240. FIG. 2 shows an embodiment where the one or more BPGs 240 comprise two distinct BPGs 240a and 240b. The BPGs 240a and 240b may be fabricated separately and stacked on top of each other, for example with an adhesive. However, as explained below, the input-coupler 112 may be or include a single BPG 240 including first and second regions having different optical properties. The BPGs 240 shown in the figures are disproportionately large relative to the substrate 106, but are shown as such for ease of understanding of their operation as explained below.

Details of the fabrication and operation of different embodiments of the one or more Bragg polarization gratings 240 are described for example in the various embodiments of U.S. Published Patent No. 2016/0033698, entitled, "Bragg Liquid Crystal Polarization Gratings," to Escuti et al. However, in general, in the field of diffraction gratings, a dimensionless parameter Q may be used to define a regime of optical behavior of a particular grating configuration, such that:

$$Q = 2\pi\lambda d / \Lambda^2 n, \quad (1)$$

where $\lambda$ is the vacuum wavelength of light, d is the grating thickness, $\Lambda$ is the grating period of the optical element (i.e., pitch), and n is the average refractive index of the medium through which the light travels. In this framework, the Bragg regime can be defined as Q>1, the RamanNath regime can be defined as Q<1, and Q=1 may refer to a mixed regime with properties of both.

In embodiments of the present technology, the one or more polarization gratings used at the input-coupler 112 may be formed for example with liquid crystal materials having a grating period $\Lambda$, thickness d, and/or average refractive index n that are selected such that the Bragg condition (Q>1) is attained for the wavelengths of light that the system uses. Each of the above parameters may be selected to tune the BPGs 240 to provide light propagation in accordance with aspects of the present technology, including but not limited to high diffraction efficiency, limited diffraction orders, and/or polarization selectivity. These features are explained in greater detail below.

FIG. 4 is a magnified view of an example of a BPG 240 including a single polarization grating, but fabricated with two distinct regions 246a and 246b, separated by a boundary interface 248. Each region 246a, 246b includes a plurality of sub-layers 242 including liquid crystal molecules 244 (one of which is numbered). As noted in Published Patent No. 2016/0033698 to Escuti, the sub-layers 242 may be multiple, stacked polymerized nematic liquid crystal sub-layers formed by patterning thin films with optical anisotropy. In particular, the liquid crystal sub-layers 242 in each region 246a, 246b may have local optical axes, which may be defined by liquid crystal molecule 244 orientations that are aligned through a thickness of the sub-layers and across interfaces between the sub-layers.

The liquid crystal molecular orientations are not aligned across the boundary 248 between regions 246a and 246b as explained below. In particular, as shown, the liquid crystal molecules in region 246a have a right-handed twist helix 450, while the liquid crystal molecules in region 246b have a left-handed twist helix 452. This provides the regions 246a and 246b with different diffractive properties for polarized light as explained below.

The particular molecular orientations shown in FIG. 4 are by way of example only, and may vary in further embodiments, both within and between the regions 246a, 246b. Additionally, it is understood that the positions of regions 246a and 246b may be switched in further embodiments. Fabricating the regions so that the twist helixes reverse at the boundary 248 allows a single BPG 240 to diffract light of different polarizations in different directions as explained below.

Where the input-coupler 112 includes a pair of stacked BPGs 240a, 240b as shown in FIG. 2, the BPG 240a may be fabricated with liquid crystal sub-layers as in region 246a, and the BPG 240b may be fabricated with liquid crystal sub-layers as in region 246b. In further embodiments, the one or more BPGs 240 may include more than two gratings or, where a single grating, more than two regions, as explained below.

It is a property of a Bragg polarization grating in general that it may have a zero order of light which propagates through the grating parallel to the angle of incidence of the incoming light, and a first order of light which gets diffracted and propagates through the grating off axis relative to the angle of incidence of the incoming light. In embodiments of the present technology, the one or more BPGs 240 (whether formed of two separate gratings 240a, 240b, or a single grating with two separate regions 246a, 246b) may be fabricated to have high selectivity for the first order of light diffracted through the one or more BPGs. In particular, the optical properties of the one or more BPGs 240 may be selected to maximize the first order of light and minimize the zero order of light propagated through the one or more BPGs 240. As will now be explained, there are two first order diffractions: a positive (+1) in one direction, and a negative (−1) in another direction.

FIGS. 5 and 6 show the input of light from the display engine 204 and polarization assembly 230 into the substrate 106 at two different times via input-coupler 112. The figures show three representative beams of light of different wavelengths, for example red, green and blue, leaving the light engine, and incident on the input-coupler, at different angles. There would be a multitude of other light beams at these and other angles.

The input-coupler 112 includes the one or more BPGs 240 which are able to diffract first orders of polarized light received at different times in different directions, depending on the different polarizations of light received. In particular, at a time, t1, the input-coupler 112 receives, e.g., RHC polarized light from the display engine 204 and polarization assembly 230 (step 310, FIG. 3). In the example shown in FIG. 5, the first (upper) BPG 240a has the same "handedness" as the incoming RHC polarized light at time t1. Thus, the BPG 240a diffracts the incoming RHC polarized light in a positive first order (+1) in a first direction (to the right in the positive x-direction in FIG. 5). As noted above, the +1 order of diffracted RHC polarized light may be maximized relative to any other orders of light. There may be some zero order of RHC polarized light (not shown) which propagates through the BPG 240a. As the bottom BPG 240b is not tuned for RHC polarized light, the RHC polarized light passes through the BPG 240b un-diffracted.

At a second time, t2>t1, the input-coupler 112 receives LHC polarized light from the display engine 204 and polarization assembly 230 as shown in FIG. 6 (step 312). As the top BPG 240a is not tuned for LHC polarized light, the LHC polarized light passes through the BPG 240a un-diffracted. However, the second (bottom) BPG 240b has the same handedness as the incoming LHC polarized light at time t2. Thus, the BPG 240b diffracts the incoming LHC polarized light in a negative first order (−1) in a second direction (to the left in the negative x-direction in FIG. 6). As above, the −1 order of diffracted LHC polarized light may be maximized relative to any other orders of light. There may be some zero order of LHC polarized light (not shown) which propagates through the BPG 240b.

As noted, the polarization assembly may employ a time-division multiplexing scheme which switches the polarization of the light input to the input-coupler 112 back and forth between RHC and LHC, for example 60 to 120 per second. Thus, the image generated by the display engine 204 is cyclically tiled by the one or more BPGs 240 to the left and right sides (along the x-direction) of the substrate 106 for example 60 to 120 times per second. The tiling may occur at a faster or slower rate than 60 to 120 times per second.

Once input by the one or more BPGs 240 to the substrate 106 in the first and second directions (+1 and −1 orders), light corresponding to the image can travel to the left and right through the waveguide by way of total internal reflection (TIR). TIR is a phenomenon which occurs when a propagating light wave strikes a medium boundary (e.g., of the bulk-substrate 106) at an angle larger than the critical angle with respect to the normal to the surface. In other words, the critical angle ($\theta_c$) is the angle of incidence above which TIR occurs, which is given by Snell's Law, as is known in the art. More specifically, Snell's law specifies that the critical angle ($\theta_c$) is specified using the following equation:

$$\theta_c = \sin^{-1}(n2/n1) \quad (2)$$

where:
- $\theta_c$ the critical angle for two optical mediums (e.g., the bulk-substrate 106, and air or some other medium that is adjacent to the bulk-substrate 106) that meet at a medium boundary,
- n1 is the index of refraction of the optical medium in which light is traveling towards the medium boundary (e.g., the bulk-substrate 106, once the light is couple therein), and
- n2 is the index of refraction of the optical medium beyond the medium boundary (e.g., air or some other medium adjacent to the bulk-substrate 106).

In embodiments, the one or more BPGs are patterned so that light enters the substrate 106 in the +1 and 1− orders at angles of incidence greater than $\theta_c$. Thus, as shown, the light rays of the +1 and −1 orders travel through the substrate 106 by TIR. In embodiments, the desired angles of incidence of the +1 and −1 orders may be accomplished by controlled selection of the grating thickness(es) of the one or more BPGs, BPG period and refractive index of the one or more BPGs. In further embodiments, the properties of light diffracted through the one or more BPGs 240 may be advantageously controlled by providing a chiral slant to the liquid crystal molecules 244 through a thickness of the sub-layers and across interfaces between the sub-layers. Chiral slanting of liquid crystal molecules is discussed in the above-mentioned Published Patent No. 2016/0033698 to Escuti.

As seen in FIGS. 5 and 6, light from the input-coupler 112 is cyclically tiled left and right to the first and second intermediate components 114a, 114b, which in turn steer the light to the output coupler 116 as explained below. The light tiled or directed from the input-coupler 112 to the first intermediate component 114a is a first portion of the FOV. The light tiled or directed from the input-coupler 112 to the second intermediate component 114a is a second portion of the FOV. As discussed below, the first and second portions of the FOV sent in different directions are dissimilar, but may have an overlap.

Embodiments where an image is tiled to multiple intermediate components provides significant advantages. For example, such embodiments can provide for a total diagonal FOV that is very large, even though each of the intermediate components individually support a relatively smaller FOV (e.g., a diagonal FOV of no more than about 35 degrees). Demonstrations of embodiments of the present technology have shown that such embodiments can be used to obtain a diagonal FOV of nearly about 70 degrees, where the index of refraction of the bulk-substrate of the optical waveguide is about 1.7 (i.e., n1≈1.7). Accordingly, it has been demonstrated that embodiments of the present technology can be used to nearly double the diagonal FOV, compared to the FOV that could be achieved using a conventional waveguide, where light is steered to a single intermediate or output grating. It is noted that the term FOV, as used herein, refers to the diagonal FOV, unless stated otherwise.

Figure 7:
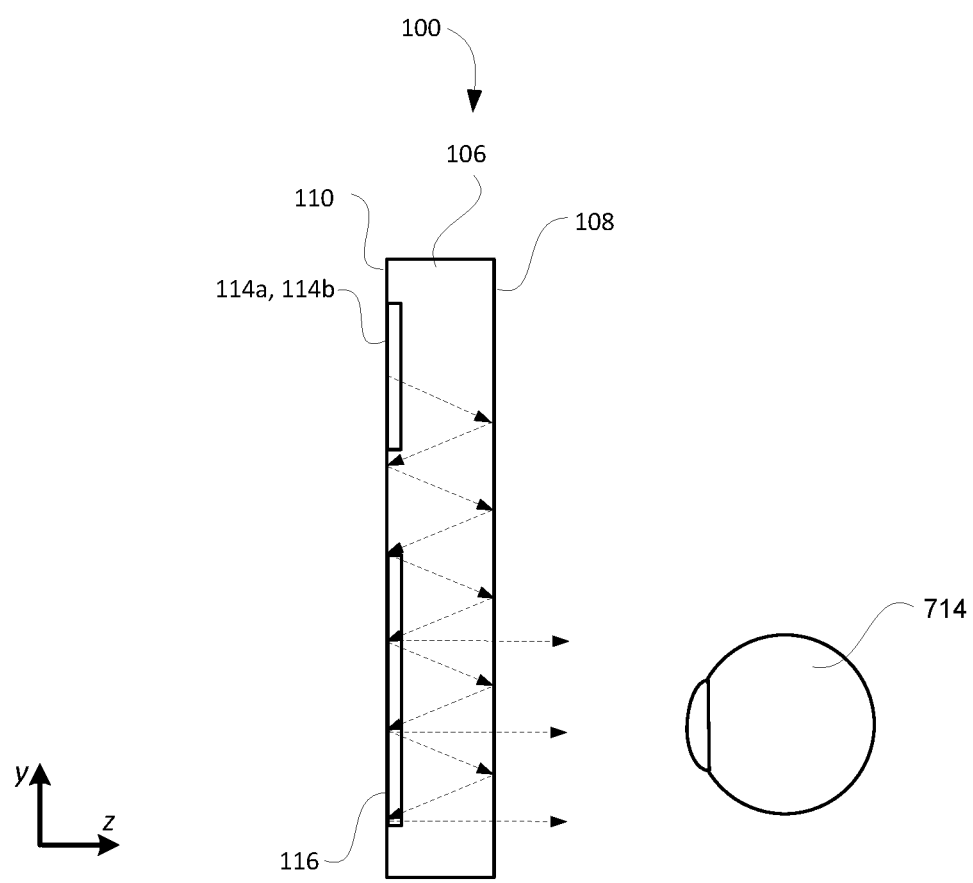
FIG. 7 is a side view showing diffraction of light by the first and second intermediate components within the waveguide.

FIG. 7 is a side view showing light coupling into the first and second intermediate components 114a, 114b and diffracting downward toward output-coupler 116 by TIR within the substrate 106 (step 314, FIG. 3). Further, the intermediate components 114a, 114b may also be configured to perform one of horizontal or vertical pupil expansion, and the output-coupler 116 may be configured to perform the other one of horizontal or vertical pupil expansion. Given the tiling of the image to the first and second intermediate components, horizontal pupil expansion by the intermediate components 114a, 114b or the output-coupler 116 may be omitted.

The output-coupler 116 may be configured to couple the light corresponding to the combined first and second portions of the FOV out of the optical waveguide 100 so that the light corresponding to the image and the combined first and second portions of the FOV is output from the optical waveguide 100 and viewable from an output-pupil (step 316). FIG. 7 also shows a representation of a human eye 714 that is using the waveguide 100 to observe an image produced using the display engine 204 and redirected by waveguide 100.

In the embodiments of the present technology described above and below, the input-coupler 112 splits the FOV into the first and second portions by diffracting a portion of the FOV in the first direction toward the first intermediate component 114a, and diffracting a portion of the FOV in the second direction toward the second intermediate component 114b. The output-coupler 116, by combining the light corresponding to the first and second portions of the FOV, unifies the FOV that was split by the input-coupler 112. Beneficially, the FOV associated with the light coupled out of the optical waveguide 100, by the output-coupler 112, is greater than a maximum FOV that each of the first and second intermediate components 114 can support on their own.

Assume that the FOV of the light coupled into the waveguide 100 by the input-coupler 112 is nearly or about 70 degrees, and that the each of the intermediate component 114a and 114b can individually support a FOV of only about 35 degrees. In this example, the input-coupler 112 can split the 70 degree FOV into a first 35 degree FOV portion (which travel by way of TIR to the first intermediate component 114a) and a second 35 degree FOV portion (which travel by way of TIR to the second intermediate component 114b). For example, the first portion of the FOV can be from 0 to 35 degrees, and the second portion of the FOV can be from 35 to 70 degrees. The output-coupler 116 can then combine the light corresponding to the first 35 degree portion of the FOV (which travel through the optical waveguide by way of TIR from the first intermediate component 114a to the output-coupler 116) and the light corresponding to the second 35 degree FOV (which travel through the optical waveguide by way of TIR from the second intermediate components 114b to the output-coupler 116), to thereby unify the two 35 degree FOV portions into the original FOV of nearly or about 70 degrees.

The output-coupler 116 couples the light corresponding to the combined first and second portions of the FOV, i.e., combined to have the FOV of nearly or about 70 degrees, out of the optical waveguide 100 so that the light corresponding to the image and the combined first and second portions of the FOV is output from the optical waveguide 100 and viewable from an output-pupil. Accordingly, the FOV associated with the light coupled out of the optical waveguide 100, by the output-coupler 112, is greater than the about 35 degree FOV that each of the first and second intermediate components 114a and 114b can support on their own.

The first and second portions of the FOV may be the same or they may differ from one another. Depending upon the implementation, the first and second portions of the FOV may (or may not) partially overlap one another. Accordingly, where first and second portions of the FOV partially overlap one another, the first portion of the FOV may be, e.g., from 2 to 37 degrees, and the second portion of the FOV may be from 33 to 68 degrees. This is just one example, which is not intended to be limiting.

The waveguide 100 can be incorporated into a near-eye display such as a head-mounted display (HMD) device or other see-through mixed reality display device system. The waveguide 100, the display engine 204 and polarization assembly 230 described above with respect to FIGS. 1A-7 may generate an image which is displayed to a single eye. A separate instance of the waveguide 100, the display engine 204 and polarization assembly 230 can be provided for each of the left and right eyes of a user. However, a single waveguide 100, display engine 204 and polarization assembly 230 may be configured to generate an image that is sent to both of the left and right eyes.

In certain embodiments, the waveguide(s) 100 may be positioned next to or between see-through lenses, which may be standard lenses used in eye glasses and can be made to any prescription (including no prescription). Where a see-through mixed reality display device system is implemented as an HMD device including a frame, the display engine 204 can be located to the side of the frame so that it sits near to a user's temple. Alternatively, the display engine 204 can be located in a central portion of the HMD glasses that rests above a nose bridge of a user. Other locations for the display engine 204 are also possible. In these instances, the user can also be referred to as a wearer. Where there is a separate waveguide for each of the left and right eyes of a user, there can be a separate display engine for each of the waveguides, and thus, for each of the left and right eyes of the user. In embodiments, one or more further adjacent waveguides can be used to perform eye tracking based on infrared light that is incident on and reflected from the user's eye(s) 714, as is known in the art.

Figure 8:
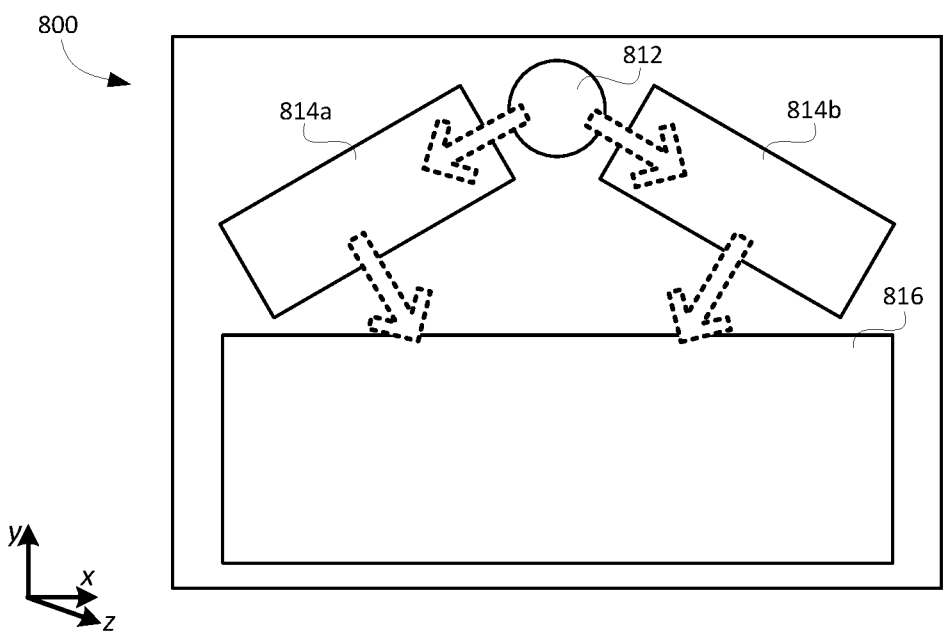
FIG. 8 is a front view of an embodiment showing diffraction of light by the input-coupler and first and second intermediate components within the waveguide according to embodiments of the present technology.

FIG. 8 is a front view of an optical waveguide 800, according to a further embodiment of the present technology. The optical waveguide 800 shown in FIG. 8 includes an input-coupler 812, two intermediate components 814a and 814b, and an output-coupler 816. In this embodiment, the input-coupler 812 may have a circular shape and may include one or more BPGs as described above. The input-coupler 812 may be configured to couple light corresponding to an image associated with an input-pupil, and having a corresponding FOV, into the optical waveguide 800 (and more specifically into the bulk-substrate of the optical waveguide).

The one or more BPGs of the input-coupler 812 may also be configured to diffract a first portion of the light corresponding to the image in a first direction toward the first intermediate component 814a such that a first portion of the FOV travels through the optical waveguide 800 from the input-coupler 812 to the first intermediate component 814a. A second portion of light corresponding to the image may be diffracted by the input-coupler 812 in a second direction toward the second intermediate component 814b such that a second portion of the FOV travels through the optical waveguide 800 from the input-coupler 812 to the second intermediate component 814b. The first and second portions of the FOV may differ from one another, and depending upon implementation, may (or may not) partially overlap one another. The first and second directions, in which the input-coupler 212 diffracts light, also differ from one another. In the configuration shown, the first direction is a leftward direction, and the second direction is a rightward direction. More specifically, as compared for example to the embodiment of FIG. 1A, the first direction is both leftward and acutely angled downward, and the second direction is both rightward and acutely angled downward.

In the configuration shown, the intermediate component 814a may be configured to perform horizontal pupil expansion, and to diffract light corresponding to the first portion of the FOV, which travels through the optical waveguide from the input-coupler 812 to the first intermediate component 814a, toward the output coupler 816. The intermediate component 814b may be configured to perform horizontal pupil expansion, and to diffract light corresponding to the second portion of the FOV, which travels through the optical waveguide from the input-coupler 812 to the second intermediate component 814b, toward the output coupler 816.

In the configuration shown, the output-coupler 816 is configured to combine the light corresponding to the first and second portions of the FOV, which travel through the optical waveguide from the first and second intermediate components 814a and 814b to the output-coupler 816. The output-coupler 816 is also configured to couple the light corresponding to the combined first and second portions of the FOV out of the optical waveguide 800 so that the light corresponding to the image and the combined first and second portions of the FOV is output from the optical waveguide 800 and viewable from an output-pupil.

In the FIGS. (e.g., FIGS. 1A-C and 8), the waveguides (e.g., 100 and 800) were typically shown as including a pair of planar surfaces. In an alternative embodiment, surfaces of a waveguide (e.g., 100 and/or 800) could be non-planar, i.e., curved. While gratings may be more easily manufactured on or in planar surfaces, with curved surface(s) it could be possible to reduce some of the aberrations in a system.

Embodiments described above included for example two intermediate components. However, further embodiments may include more than two intermediate components. In such embodiments, the one or more further intermediate components is/are each configured to diffract light, corresponding to at least a portion of the FOV that is incident on the further intermediate component, toward the output-coupler of the optical waveguide. An example of such an embodiment is shown in FIG. 9.

Referring to FIG. 9, an optical waveguide 900 is shown as including an input-coupler 912, four intermediate components 914a, 914b, 914c and 914d, and an output-coupler 916. The input-coupler 912 includes one or more BPGs as described above and is configured to couple light corresponding to an image associated with an input-pupil, and having a corresponding FOV, into the optical waveguide 900.

The one or more BPGs of the input-coupler 912 are also configured to diffract a portion of the light corresponding to the image in a first direction toward the intermediate component 914a such that a first portion of the FOV travels through the optical waveguide 900 from the input-coupler 912 to the intermediate component 914a. A second portion of light corresponding to the image may be diffracted by the input-coupler 912 in a second direction into the intermediate component 914b. A third portion of light corresponding to the image may be diffracted by the input-coupler 912 in a third direction into the intermediate component 914c. And a fourth portion of light corresponding to the image may be diffracted by the input-coupler 912 in a fourth direction into the intermediate component 914d.

Depending upon implementation, the portion of the FOV provided to the intermediate component 914a may be the same or different than the portion of the FOV provided to the intermediate component 914b; and the portion of the FOV provided to the intermediate component 914c may be the same or different that the portion of the FOV provided to the intermediate component 914d.

Using embodiments described above, a large FOV of at or near 70 degrees, and potentially up to 90 degrees or even larger, can be achieved by an optical waveguide that utilizes one or more BPGs, even where the intermediate components individually can only support of FOV of about 35 degrees.

In embodiments described above, a zero order of the polarized light passing through the one or more BPGs is minimized (and ignored). However, in a further embodiment, the one or more BPGs may be tuned so that the RHC polarized light intensity is split in some predefined, desired proportion between the +1 order and zero order, and the LHC polarized light intensity is split in some predefined, desired proportion between the −1 order and zero order. In such embodiments, the +1 and −1 orders of polarized light may be diffracted toward the first and second (or more) intermediate components as described above. In this embodiment, the zero orders of the RHC and/or LHC polarized light, representing some portion of the FOV, may be passed through the input-coupler (112, 812) directly to the output-coupler (116, 816). The output coupler may then combine the portions of the FOV received from the two or more intermediate components and the input-coupler to provide the total FOV.

In embodiments described above, for example with respect to FIGS. 5 and 6, the one or more BPGs 240 of input-coupler 112 were transmissive. That is, they diffracted light while transmitting the light. In further embodiments, at least one of the one or more BPGs 240 of the input-coupler may be reflective. That is, the at least one BPG may diffract light while reflecting it. One example of such an embodiment will now be described with respect to FIGS. 10 and 11.

The embodiment shown in FIGS. 9 and 10 includes a waveguide 1000 having an input coupler 1012 with a first BPG 240a on the rear surface 110 of the substrate 106, and a second BPG 240b on the front surface 108 of the substrate 106. Referring initially to FIG. 10, RHC polarized image light at time t1 will pass through the first BPG 240a and diffract to the right (+1 order) as described above. As shown in FIG. 11, LHC polarized image light at time t2 will pass through BPG 240a and the substrate 106 unaffected (undiffracted). Upon striking BPG 240b, the light is reflected while being diffracted to the left (−1 order).

The BPG 240b is tuned to diffract the LHC polarized light to the left at an angle above TIR critical angle, so that light diffracted from the BPG 240b travels through the substrate 106 by TIR until it reaches an intermediate component, such as intermediate component 114a shown in FIG. 1A. The diffracted +1 and −1 orders of light propagate through the waveguide 1000, and recombine at the output-coupler 116 as described above.

In further embodiments, the rear-side BPG 240a may transmit diffracted light to left (−1 order), and the front-side BPG 240b may reflect diffracted light to the right (+1 order). In a still further embodiment, both of the BPGs 240a and 240b may be stacked on the front-side 108 of the substrate 106. In such an embodiment, the BPG 240a will reflect one of the RHC and LHC polarized image lights diffracted to the right (+1 order), and the BPG 240b will diffract the other of the RHC and LHC polarized image lights diffracted to the left (−1 order).

As noted, the optical waveguides (e.g., 100, 800, 1000) described herein can be incorporated into a near-eye display such as a see-through mixed reality display device system. The same waveguide can be used to steer light of multiple different colors (e.g., red, green and blue) associated with an image from the input-coupler to the output-coupler. Alternatively, each of the BPGs and/or the waveguides of components 114, 116 can be stacked adjacent to each other, with each of the waveguides being used to steer light of a different color (e.g., red, green or blue) associated with an image from its respective input-coupler to its output-coupler. It would also be possible that one waveguide handle light of two colors (e.g., green and blue) and another waveguide handles light of a third color (e.g., red). Other variations are also possible.

In embodiments described above, the polarization of light from a single display engine is switched between first and second different polarizations according to a time division multiplexing scheme. In a further embodiment, a first display engine may provide light of a first polarization and a second display engine may provide light of a second polarization orthogonal to the first polarization. In such embodiments, the light from the two different display engines may be incident on the BPGs 140 at the same time. The two different polarizations of light will trace out the two different portions of the FOV as described above.

In summary, an example of the present technology relates to an optical assembly for generating an image in a near-eye display, comprising: an optical waveguide; and one or more Bragg polarization gratings configured to: receive polarized light from the image of a first polarization at a first time, receive polarized light from the image of a second polarization at a second time, the second polarization being different than the first polarization, and the second time being different than the first time, diffract a first order of the received polarized light of the first polarization in a first direction into the optical waveguide, and diffract a first order of the received polarized light of the second polarization in a second direction into the optical waveguide, the second direction being different than the first direction; diffraction of the polarized light in the first and second directions providing an enlarged field of view of the image relative to a field of view obtained from the light diffracted in one of the first and second directions.

In another example, the present technology relates to an optical assembly for generating an image in a near-eye display, comprising: a polarization assembly for generating time-multiplexed left-handed circular (LHC) polarized light from the image and right-handed circular (RHC) polarized light from the image; and an optical waveguide comprising an input-coupler for coupling the LHC and RHC polarized light from the image into the waveguide, the input-coupler comprising one or more Bragg polarization gratings for receiving the time-multiplexed LHC and RHC polarized light from the image, the one or more Bragg polarization gratings diffracting a first order of the received LHC polarized light in a first direction into the optical waveguide, and the one or more Bragg polarization gratings diffracting a first order of the received RHC polarized light in a second direction into the optical waveguide different than the first direction; wherein diffraction of the polarized light in the first and second directions provides an enlarged field of view of the image relative to a field of view obtained from the light diffracted in one of the first and second directions.

In a still further example, the present technology relates to an optical assembly for generating a field of view (FOV) of an image in a near-eye display, comprising: an optical waveguide comprising an input-coupler, first and second intermediate-components and an output-coupler; the input-coupler comprising one or more polarization gratings configured to: couple light corresponding to the FOV into the optical waveguide, diffract at least a portion of the light corresponding to a first portion of the FOV in a first direction toward the first intermediate-component at a first time, and diffract at least a portion of the light corresponding to a second portion of the FOV, different than the first portion of the FOV, in a second direction toward the second intermediate-component at a second time different than the first time; the first intermediate-component configured to diffract light corresponding to the first portion of the FOV toward the output coupler; the second intermediate-component configured to diffract light corresponding to the second portion of the FOV toward the output coupler; and the output-coupler configured to: combine the light corresponding to the first and second portions of the FOV, and output the combined first and second portions of the FOV to an output-pupil of the near-eye display.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An optical assembly for generating an image in a near-eye display, comprising:
    an optical waveguide; and
    one or more Bragg polarization gratings configured to:
        receive polarized light of a first polarization,
        receive polarized light of a second polarization, the second polarization being different than the first polarization,
        diffract a first order of the received polarized light of the first polarization in a first direction into the optical waveguide,
        diffract a first order of the received polarized light of the second polarization in a second direction into the optical waveguide, the second direction being different than the first direction; and
        diffraction of the polarized light in the first direction and the second direction providing an enlarged combined field of view of the image relative to a field of view obtained from the polarized light diffracted in one of the first direction and the second direction, wherein the enlarged combined field of view is greater than a maximum field of view that each of the one or more Bragg polarization gratings supports.

2. The optical assembly of claim 1, the one or more Bragg polarization gratings comprising a single Bragg polarization grating having a first region with a first set of optical properties and a second region with a second set of optical properties, the first region diffracting the polarized light of the first polarization in the first direction, and the second region diffracting the polarized light of the second polarization in the second direction.

3. The optical assembly of claim 2, wherein the polarized light of the second polarization passes through the first region without diffracting.

4. The optical assembly of claim 1, the one or more Bragg polarization gratings comprising a first Bragg polarization grating and a second Bragg polarization grating, the first Bragg polarization grating receiving and diffracting the polarized light of the first polarization, the second Bragg polarization grating receiving and diffracting the polarized light of the second polarization, wherein the polarized light of the second polarization passes through the first Bragg polarization grating without diffracting.

5. The optical assembly of claim 1, wherein the one or more Bragg polarization gratings are tuned to maximize an intensity of the diffracted first order of the polarized light of the first polarization relative to a zero order of the polarized light of the first polarization, and wherein the one or more Bragg polarization gratings are tuned to maximize an intensity of the diffracted first order of the polarized light of the second polarization relative to a zero order of the polarized light of the second polarization.

6. The optical assembly of claim 1, wherein at least one of the one or more Bragg polarization gratings are transmission grating.

7. The optical assembly of claim 1, wherein at least one of the one or more Bragg polarization gratings are reflection gratings.

8. The optical assembly of claim 1, wherein switching occurs between the first polarization and the second polarization according to a time-division multiplexing scheme at least once in an image frame.

9. The optical assembly of claim 1, wherein the first polarization is generated by a first display engine and the second polarization is generated at a same time by a second display engine.

10. The optical assembly of claim 1, wherein the polarized light of the first polarization is left-handed circular polarized light, and the polarized light of the second polarization is right-handed circular polarized light.

11. An optical assembly for generating an image in a near-eye display, comprising:
    a polarization assembly for generating time-multiplexed left-handed circular (LHC) polarized light and right-handed circular (RHC) polarized light; and
    an optical waveguide comprising an input-coupler for coupling the LHC polarized light and the RHC polarized light from the image into the waveguide, the input-coupler comprising one or more Bragg polarization gratings for receiving the time-multiplexed LHC and RHC polarized light from the image, the one or more Bragg polarization gratings diffracting a first order of the LHC polarized light in a first direction into the optical waveguide, and the one or more Bragg polarization gratings diffracting a first order of the RHC polarized light in a second direction into the optical waveguide, wherein the second direction is different than the first direction;
    wherein diffraction of the polarized light in the first direction and the second direction provides an enlarged combined field of view of the image relative to a field of view obtained from the polarized light diffracted in one of the first direction or the second direction, wherein the enlarged combined field of view is greater than a maximum field of view that the input-coupler supports.

12. The optical assembly of claim 11, wherein the one or more Bragg polarization gratings comprise a first Bragg polarization grating and a second Bragg polarization grating, the first Bragg polarization grating transmitting light and the second Bragg polarization grating reflecting light.

13. The optical assembly of claim 11, the polarization assembly comprising:
- a fast polarization modulator for polarizing light from the image into a first orthogonal polarization and a second orthogonal polarization of light from the image; and
- a chromatic quarter-waveplate for converting the first orthogonal polarization and the second orthogonal polarization into the LHC polarized light and the RHC polarized light.

14. The optical assembly of claim 13, the fast polarization modulator further configured to time division multiplex the generation of the first orthogonal polarization and the second orthogonal polarization at least once an image frame.

15. The optical assembly of claim 11, the one or more Bragg polarization gratings comprising a single Bragg polarization grating having a first region with a first set of optical properties and a second region with a second set of optical properties different than the first set of optical properties.

16. The optical assembly of claim 11, the one or more Bragg polarization gratings comprising a first Bragg polarization grating and a second Bragg polarization grating, the first Bragg polarization grating receiving and diffracting the first order of one of the LHC polarized light or the RHC polarized light, the second Bragg polarization grating receiving and diffracting the first order of an other one of the LHC polarized light or the RHC polarized light, wherein the other one of the LHC polarized light or the RHC polarized light passes through the first Bragg polarization grating with a comparatively minimal diffraction.

17. An optical assembly for generating a field of view (FOV) of an image in a near-eye display, comprising:
- an optical waveguide comprising an input-coupler, a first intermediate-component, a second intermediate-component, and an output-coupler;
- the input-coupler comprising one or more polarization gratings configured to:
  - couple light corresponding to the FOV into the optical waveguide,
  - diffract at least a first portion of the light corresponding to a first portion of the FOV in a first direction toward the first intermediate-component at a first time, and
  - diffract at least a second portion of the light corresponding to a second portion of the FOV, different than the first portion of the FOV, in a second direction toward the second intermediate-component at a second time different than the first time;
- the first intermediate-component configured to diffract light corresponding to the first portion of the FOV toward the output coupler;
- the second intermediate-component configured to diffract light corresponding to the second portion of the FOV toward the output coupler; and
- the output-coupler configured to:
  - combine the light corresponding to the first portion and the second portion of the FOV to define a combined first and second portions of the FOV; and
  - output the combined first and second portions of the FOV to an output-pupil of the near-eye display, wherein the combined first and second portions of the FOV is greater than a maximum FOV that each of the first intermediate-component and the second-intermediate component supports.

18. The optical assembly of claim 17, wherein the one or more polarization gratings of the input-coupler are configured according to a Bragg regime.

19. The optical assembly of claim 17, wherein at least one of the one or more polarization gratings comprise a transmission grating.

20. The optical assembly of claim 17, wherein the optical assembly is used in one of a virtual reality and an augmented reality head mounted display.

* * * * *